United States Patent [19]

Molitorisz

[11] 4,273,034

[45] Jun. 16, 1981

[54] BALE FORMING APPARATUS

[76] Inventor: Joseph Molitorisz, 624 81st Ave. NE., Bellevue, Wash. 98004

[21] Appl. No.: 114,622

[22] Filed: Jan. 23, 1980

[51] Int. Cl.³ .............................................. B65B 13/20
[52] U.S. Cl. ......................................... 100/8; 100/80; 100/144; 100/151; 100/191
[58] Field of Search .................... 100/8, 40, 76, 80, 81, 100/144, 151, 191

[56] References Cited

U.S. PATENT DOCUMENTS

| 751,119 | 2/1904 | Thomas | 100/80 X |
| 928,563 | 7/1909 | Thoens | 100/80 |
| 2,731,782 | 1/1956 | Mason | 100/80 X |

FOREIGN PATENT DOCUMENTS 139340  3/1903  Fed. Rep. of Germany ............. 100/80

Primary Examiner—Billy J. Wilhite

[57] ABSTRACT

The invention pertains to a bale forming apparatus for making rectangular bales in any size, but especially suitable to make large size bales. The unique mechanism consists of; a bale forming channel, and a feeder-compactor assembly. The feeder-compactor assembly is power driven to perform a reversing motion relative to the bale forming channel, depositing, and compressing the successive layers of the bale in continuous folded-like arrangement. The apparatus requires substantially less energy than the conventional balers of the same size.

1 Claim, 3 Drawing Figures

U.S. Patent  Jun. 16, 1981  4,273,034
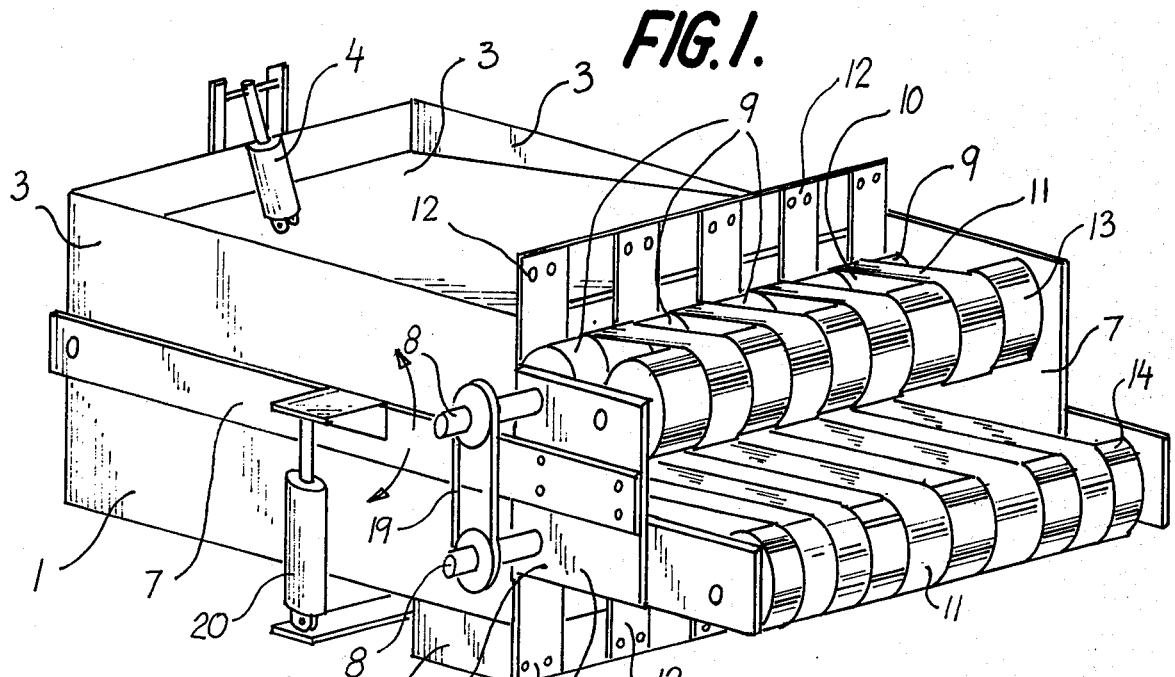
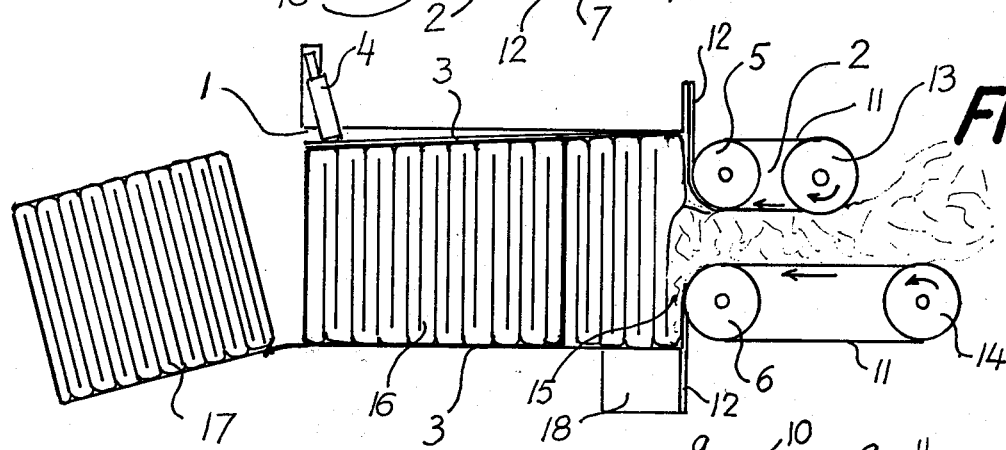
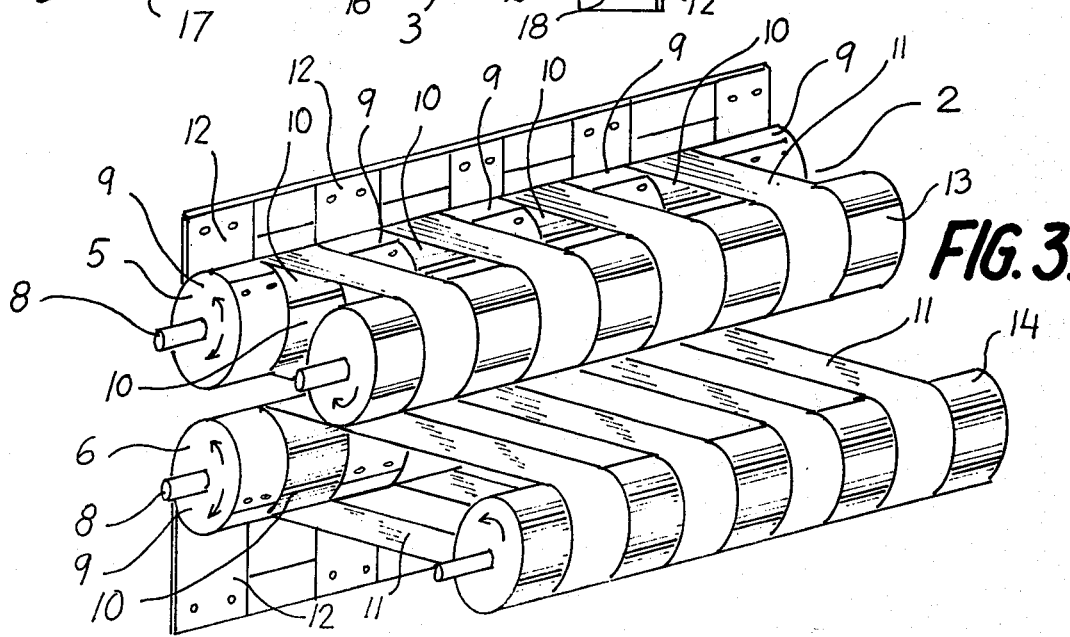

BALE FORMING APPARATUS

BACKGROUND OF THE INVENTION

1. Field of the Invention

This invention pertains to an apparatus for forming relatively large size rectangular bales of fibrous material, such as agricultural crops and industrial products, using a continuous compaction process, requiring substantially less energy than the conventional balers.

2. Description of Prior Art

The most common bale forming machines producing rectangular bales use reciprocating plunger mechanism to compress separate layers of fibrous material.

U.S. Pat. No. 4,175,487, issued to this inventor, discloses a bale forming apparatus which applies a unique mechanism, consisting of; a feeder-compactor assembly, and a bale forming channel assembly. The feeder-compactor rollers of the feeder-compactor assembly receive reversing rotational power drive, causing the feeder-compactor assembly to perform a reversing upward-downward motion at or near the intake port of the bale forming channel. The continuously delivered and compressed layers of the fibrous material are deposited in the bale forming channel in folded arrangement. The finished and tied bales are forced through the bale forming channel, and are discharged at the discharge opening of the bale forming channel.

The co-pending application of this inventor, Ser. No.; 06/067,187, discloses a bale forming apparatus which consists of; a feeder-compactor assembly, and a bale forming chamber. The bale forming chamber is confined by four side walls, one end wall and one open intake port, which also serves as discharge port for the finished bale. Therefore, after the formation of each bale the bale making cycle has to be interrupted to discharge the completed bale through the intake port.

SUMMARY OF THE INVENTION

The unique feature of my invention is the feeder-compactor mechanism, which receives the loose bulky fibrous material, precompresses it into a flat continuous mat, and delivers it to the bale forming channel. The feeder-compactor assembly under the action of power drive, which is applied to its structural frame, performs a reversing upward-downward motion in a plane at or near the open intake port of the bale forming channel between two of its opposite boundaries, continuously delivering and laying the precompressed material in folded-like layers, gradually compressing them to form the body of the bale with sufficient density, and forcing the bale toward the open discharge port of the bale forming channel.

The reversing oscillating motion of the feeder-compactor assembly is produced by the reversing power drive of the bearing frame which is common to the feeder-compactor rollers. A plurality of belts or chains is attached to the peripheral surface of the upper feeder compactor roller and to a suitable structural member of the upper frame of the bale forming channel, allowing the belts to wrap around the feeder-compactor roller. Similarly, a set of belts is installed between the lower feeder-compactor roller and the suitable structural member of the lower frame of the bale forming channel.

As the common bearing frame of the feeder-compactor rollers is forced upward the belts or chains of the lower feeder-compactor roller become extended over the open intake port of the bale forming channel holding the already deposited layers of fibrous material inside the bale forming channel. During the downward motion of the common bearing frame the belts or chains of the upper feeder-compactor roller are extended over the open section of the intake port of the bale forming channel. The upper and lower feeder-compactor rollers are interconnected by chain drive to assure their simultaneous rotation in identical directions during the reversing upward and downward motion of the common bearing frame, thus transmitting the rotational forces for the wrapping and unwrapping of the belts or chains.

When the desired length of the formed bale is achieved an automatic tying mechanism is activated to tie the bale into a stable unit.

The density of the bales is adjusted by a control mechanism which exerts frictional resistance against the longitudinal motion of the bale in the bale forming channel.

BRIEF DESCRIPTION OF THE DRAWINGS

FIG. 1 is an isometric schematic view of the apparatus.

FIG. 2 is a vertical transverse section of the apparatus.

FIG. 3 is an isometric schematic view of the feeder-compactor assembly.

DESCRIPTION OF THE PREFERRED EMBODIMENT

Generally stated, this invention may be applied to mobile or stationary apparatus to form fibrous material, such as agricultural crops and industrial products into relatively large size rectangular bales.

The bale forming mechanism shown in FIG. 1. comprises the bale forming channel assembly (1) and the feeder-compactor assembly (2). The bale forming channel is confined by four walls (3) of which at least one is hinged-supported and forced against the formed bale by hydraulic or mechanical means (4) to exert the desired pressure on the bale to develope frictional resistance against the longitudinal movement of the bale in the bale forming channel.

At the open intake port of the bale forming channel two feeder-compactor rollers (5) and (6) are journally mounted on a common bearing frame (7). The feeder-compactor rollers are guided in their movement between the upper and lower boundaries of the intake port of the bale forming channel by the bearing frame (7). The length of the feeder-compactor rollers is about the same as the lateral width of the intake port of the bale forming channel.

Each of the feeder-compactor rollers consists of; a common shaft (8) which holds a series of cylindrical compactor disks (9) properly spaced and key-mounted to receive power drive. Between the adjacent compactor disks bearing supported belt pulleys (10) are mounted on the shaft, which receive the belts (11) of the feed mechanism.

Between each of the compactor disks (9) of the upper feeder-compactor roller (5) and the upper frame of the intake port of the bale forming channel (1) belts, chains or ropes (12) are installed which in the upper position of the feeder-compactor assembly (2) are partially wrapped around the compactor disks (9).

Similarly, belts, chains or ropes are installed between the compactor disks (9) of the lower feeder-compactor roller (6) and the lower frame of the intake port of the bale forming channel. When the feeder-compactor assembly (2) is in its upper position these belts, chains or ropes are extended over the open section of the intake port holding the deposited layers of the formed bale inside the bale forming channel. When the feeder-compactor assembly is in its lower position the belts, chains or ropes of the upper compactor roller cover the open section of the intake port or the bale forming channel, while the belts, chains or ropes of the lower compactor roller are partially wrapped around the compactor disks (9).

The reversing upward and downward movement of the feeder-compactor assembly (2) is induced by the power drive (20) which is applied to the structural members of the bearing frame (7).

The endless feed belts or chains (11) which are installed on the pulleys (10) of the upper and lower feeder-compactor rollers and the corresponding power driven feed-rollers (13) and (14), receive and precompress the loose fibrous material into a continuous mat-like configuration, and convey this mat to the bale forming channel. The direction of rotation of the power driven feed-rollers is such that the belts positively move the precompressed mat toward the bale forming channel, regardless of the direction of rotation of the compactor disks of the feeder-compactor rollers.

When the precompressed mat of the fibrous material reaches the bale forming channel the interaction between the feeder-compactor rollers and the uppermost layer of the formed bale causes the laying of the incoming continuous mat over the uppermost layer of the formed bale. When the feeder-compactor assembly reaches its extreme upper or lower position relative to the intake port of the bale forming channel the direction of the motion of the feeder-compactor assembly is reversed. As this reversing occures the layed mat becomes folded and a successive layer (15) of the formed bale (16) is deposited. The result of this repeated reversing motion is the rapid build-up of the body of the bale.

The basic structural and functional difference between the preferred embodiment of the cited prior art apparatus, U.S. Pat. No. 4,175,487, and the present improvement is the place and the mode of the application of the power drive to the feeder-compactor assembly. In the cited prior art apparatus rotational power drive was introduced to the shafts of the feeder-compactor rollers, and the reversing upward and downward motion of the feeder-compactor assembly was achieved through wrapping and unwrapping of the belts or chains. In such application a change in the length of the belts or chains due to strech under the heavy load, was frequently observed, causing undesirable jerkiness in the operation of the apparatus. In this improvement the power drive is applied to the structural frame of the bearing frame of the feeder-compactor assembly assuring the desired consistant upward and downward motion of the assembly. To assure the fully synchronized rotation of the upper and lower feeder-compactor rollers the shafts (8) are interconnected by a drive chain (19).

The separation and tying of the individual bales (17) is accomplished by an automatic tying mechanism (18) adapted from commonly found baling machines.

While the preferred forms of the invention have been illustrated, and described, it should be understood that changes may be made without departing from the principles thereof, accordingly the invention is to be limited by a literal interpretation of the claims appended hereto.

I claim:

1. A bale forming apparatus to compress loose fibrous agricultural crops or industrial products into substantially rectangular bales which are held together by twine, wire or the like, said bale forming apparatus comprising; a longitudinally extending and substantially rectangular bale forming channel assembly, and a feeder-compactor assembly, said bale forming channel assembly having a substantially rectangular intake port, and being confined by longitudinally extending lateral boundaries, at least one of said lateral boundaries being flexibly suspended and inwardly biased by suitable biasing means, said inwardly biased lateral boundaries being in frictional contact with said formed bale exerting frictional resistance against the movement of said formed bale in said bale forming channel, said bale forming apparatus having a suitable mechanism to wrap and tie said twine, wire or the like around said formed bale, said feeder-compactor assembly consisting of; a plurality of feeder-compactor rollers rotatably supported by a common frame and being held substantially parallel relative to each other and at an adjustable distance to confine a transverse intake opening between their adjacent rotational peripheral surfaces, the common frame of said feeder-compactor assembly being pivotally mounted to said bale forming channel assembly, power drive means connected to said bale forming channel assembly and said common frame for movement thereof in a reversing up and down motion, each of said feeder-compactor rollers having a longitudinally extending shaft holding a plurality of substantially cylindrical compactor disks securely fastened to said shaft to receive rotational drive, said compactor disks being separated from each other by substantially cylindrical pulleys, said pulleys being rotatably mounted on said shaft, a plurality of belts, chains or the like being partially wrapped and at one of their ends securely attached to said compactor disks of said feeder-compactor rollers, the opposite ends of said belts, chains or the like being securely attached to suitable structural components of said bale forming channel, allowing said belts, chains or the like to wrap and unwrap around the said compactor disks of said feeder-compactor rollers as said common frame of said feeder-compactor assembly being power driven causing its reversing or oscillating upward-downward motion, said belts, chains or the like being extended between said feeder-compactor rollers and said suitable structural components of said bale forming channel in such way that those belts, chains or the like being securely attached to the said compactor disks of said upper feeder-compactor roller are also being securely attached to said suitable structural component at or near the upper boundaries of said bale forming channel, said belts, chains or the like being securely attached to said compactor disks of said lower feeder-compactor roller are also being securely attached to said suitable structural component at or near said lower boundaries of said bale forming channel, said belts, chains or the like partially covering said intake port of said bale forming channel, holding the deposited layers of the bale in said bale forming channel, said common shafts of said feeder-compactor rollers being interconnected by suitable power transmission means such as drive chain or the like, to assure the simultaneous rotational motion of said feeder-compactor rollers in identical directions as said belts, chains or the like wrap and unwrap around said feeder-compactor rollers as said common frame or said feeder-compactor assembly performs its reversing or oscillating upward downward motion in a plane at or near to said intake port of said bale forming channel between or beyond said upper and lower boundaries of said intake port of said bale forming channel, said rotatably mounted pulleys of said feeder-compactor rollers being connected to suitably positioned feeder-rollers by a plurality of endless chains, belts or the like, said feeder-rollers being journally mounted on a suitable frame and receiving power drive to cause their rotation in such way that the interaction between said plurality of endless chains, belts or the like compress and convey the loose fibrous material to said intake port of said bale forming channel regardless of the direction of rotation of said feeder-compactor rollers, said feeder-compactor rollers receiving and depositing said compressed sheet of fibrous material in a plane which is confined by the lateral boundaries of said intake port of said bale forming channel, said deposition or laying of the compressed sheet of fibrous material being accomplished in a continuous process by reversing the direction of the motion of said feeder-compactor assembly in said plane at or near said intake port of said bale forming channel at properly selected positions relative to said upper and lower boundaries of said intake port, said reversal of the direction of motion of said feeder-compactor assembly in said plane at or near said intake port of said bale forming channel causing the reversal of the laying of the compressed fibrous material, folding it at or near said upper and lower boundaries of said intake port of said bale forming channel, resulting in the buildup of the body of the bale by depositing and compressing the subsequently folded layers in said bale forming channel, said feeder-compactor rollers exerting compressive forces on said formed bale causing the compaction and sliding motion of said formed bale in said bale forming channel, said formed bale having reached its desired length being tied together by a suitable tying mechanism with twine, wire or the like, said formed and tied bale being forced out from said bale forming channel at its discharge end by the subsequently formed bales.

* * * * *